United States Patent

Norton

[15] 3,658,220

[45] Apr. 25, 1972

[54] CARTON HANDLING MECHANISM

[72] Inventor: Robert K. Norton, Twinsburg, Ohio

[73] Assignee: Harris-Intertype Corporation, Cleveland, Ohio

[22] Filed: Mar. 11, 1970

[21] Appl. No.: 18,420

Related U.S. Application Data

[63] Continuation-in-part of Ser. No. 1,257, Jan. 7, 1970.

[52] U.S. Cl. .................................225/2, 93/36 A, 225/3, 225/4, 225/94, 225/97, 225/99, 225/100
[51] Int. Cl. ...........................................................B65h 35/10
[58] Field of Search ....................225/2, 3, 4, 94, 96, 97, 98, 225/99, 100; 93/36 R, 36 A

[56] References Cited

UNITED STATES PATENTS

| | | | |
|---|---|---|---|
| 2,942,765 | 6/1960 | Baumgartner | 225/99 X |
| 2,639,772 | 5/1953 | Sandberg et al. | 225/97 |
| 3,410,183 | 11/1968 | Sarka | 93/36 A |
| 2,655,842 | 10/1953 | Baumgartner | 225/96 |
| 2,682,208 | 6/1954 | Munroe et al. | 225/94 X |

*Primary Examiner*—Frank T. Yost
*Attorney*—Yount and Tarolli

[57] ABSTRACT

An apparatus processes sheet material which has been cut into waste and articles. The articles are arranged in rows extending transverse to the direction of movement of the articles and each row is connected to an adjacent row. The articles in each row are also connected. The apparatus includes means for moving the articles at a first surface speed and means for moving the articles at a second speed in excess of the first speed so as to separate the connected rows of articles by speeding up one row of articles relative to the next successive row of articles. After the rows of articles are separated, a classifying means directs the articles into first and second paths in which skewing conveyor means operates on the articles so as to laterally separate the articles in each of the rows of articles as they move in the first and second paths. This construction provides for clean separation of the articles due to the fact that the rows of articles and the articles in each row are separated at different times and also provides for accurate control of the articles by separating the articles in each row after classification of the rows so as to eliminate the possibility of stumbling of the articles during classification.

8 Claims, 3 Drawing Figures

INVENTOR
ROBERT K. NORTON

BY Yount and Tarolli
ATTORNEYS

INVENTOR
ROBERT K. NORTON

BY Yount and Tarolli
ATTORNEYS

CARTON HANDLING MECHANISM

This application is a continuation-in-part of the Robert K. Norton copending U.S. application Ser. No. 1,257 entitled GATE MECHANISM FOR PROCESSING A STREAM OF ARTICLES, filed Jan. 7, 1970, and assigned to the same assignee as the present invention.

The present invention relates to a method and apparatus for processing sheet material which has been cut into a plurality of connected articles arranged in connected rows extending transverse to the direction of movement of the articles, and more specifically to a method and apparatus which sequentially speeds up the rows of articles so as to separate the rows of articles, classifies the articles and then laterally separates the articles in the transversely extending rows of articles.

In general, the present invention provides apparatus for processing sheet material and is especially suited to process cardboard sheet material from which box blanks or carton blanks are to be formed. The sheet material from which the box blanks are to be formed generally is printed so as to have a plurality of images thereon. The images are arranged in rows which extend transverse to the direction of movement of the sheet material and each row generally includes a plurality of like images therein with each image corresponding to one box blank. The printed material is then cut so as to form individual box blanks and the waste material is stripped therefrom.

The articles which are cut from the sheet material conventionally remain connected by portions of the sheet material and after cutting are separated. One known apparatus provides for simultaneous separation of the rows of articles and the articles in each of the rows. Such a construction results in difficulties due to the fact that the material from which the articles are formed is generally a cardboard fibrous material in which the fibers are all substantially parallel to each other. In such material the articles in each of the rows are connected by first portions of the sheet material and each row is connected by second portions of sheet material to an adjacent row. The portions of the sheet material generally are called nicks or tabs. It is desirable to break the nicks comprising the first portions of the sheet material along a line substantially perpendicular to the fibers of the sheet material and the nicks comprising the second portions of the sheet material along a line substantially parallel to the fibers of the sheet material at different times so as to cleanly separate the articles. Simultaneous breaking of the nicks comprising the first and second portions of the sheet material along lines parallel and perpendicular to the fibers results in the articles not being cleanly or sharply separated.

Moreover, if the rows of articles and the individual articles therein are separated simultaneously, poor control of the moving articles results. This problem is especially acute during classification of the articles wherein stumbling of the articles may occur due to the fact that skewing of the articles sometimes results during simultaneous separation of the rows and the individual articles in each row.

Accordingly, an object of the present invention is to provide a new and improved method and apparatus for processing a stream of articles made of sheet material wherein the hereinabove disadvantages are overcome and clean separation and accurate control of the moving articles as they are processed is accomplished.

Another object of the present invention is the provision of a new and improved method and apparatus for separating and classifying connected rows of articles which extend transverse to the direction of movement of the articles and for separating the connected articles in each of the rows wherein the separation of the transversely extending rows of articles is accomplished prior to classification of the articles by speeding up one of the transversely extending rows of articles relative to the next sequential transversely extending row of articles and separation of the articles in each row is accomplished subsequent to classification of the rows of articles to thereby provide for accurate control of the articles as they are classified and to provide for clean separation of the articles by separating the rows of articles and the articles in each of the rows at different times.

A further object of the present invention is to provide a new and improved apparatus for separating and classifying articles made of sheet material with the articles arranged in connected rows extending transverse to the direction of movement of the articles with each row having a plurality of connected articles therein, including first means for moving the articles at a first speed, second means located adjacent to the first means for moving the articles at a second speed in excess of the first speed to thereby sequentially separate the connected transversely extending rows of articles, classifying means for directing the separated transversely extending rows of articles to first and second paths, and a skewing conveyor means for operating on the articles moving in the first and second paths so as to laterally separate the connected articles.

Another object of the present invention is to provide a new and improved method for separating and classifying articles made of sheet material with the articles arranged in connected rows extending transverse to the direction of movement of the articles with each row having a plurality of laterally adjacent connected articles therein including the steps of moving the articles at a first speed, sequentially speeding up each row of articles relative to the next successive row of articles so as to separate the connected transversely extending rows of articles, directing the rows of articles into a plurality of paths, and laterally separating the connected articles in each row as the articles move through the plurality of paths.

Further objects and advantages of the present invention should become apparent from the following detailed description of the preferred embodiment of the present invention made with reference to the accompanying drawings forming a part of the specification and wherein.

The present invention provides an improved apparatus for processing a stream of articles which have been cut from sheet material. In general, the apparatus is operable to separate a plurality of connected articles formed from sheet material so that the articles may be delivered to different locations where they may be stacked. The preferred embodiment of the present invention to be described hereinbelow is especially adapted for use in the formation of carton or box blanks from fibrous sheet material and is of a construction which provides for extremely high speed and reliable operation and is easily adjustable so that the mechanism may handle many different types of carton or box blanks.

Figure 1:
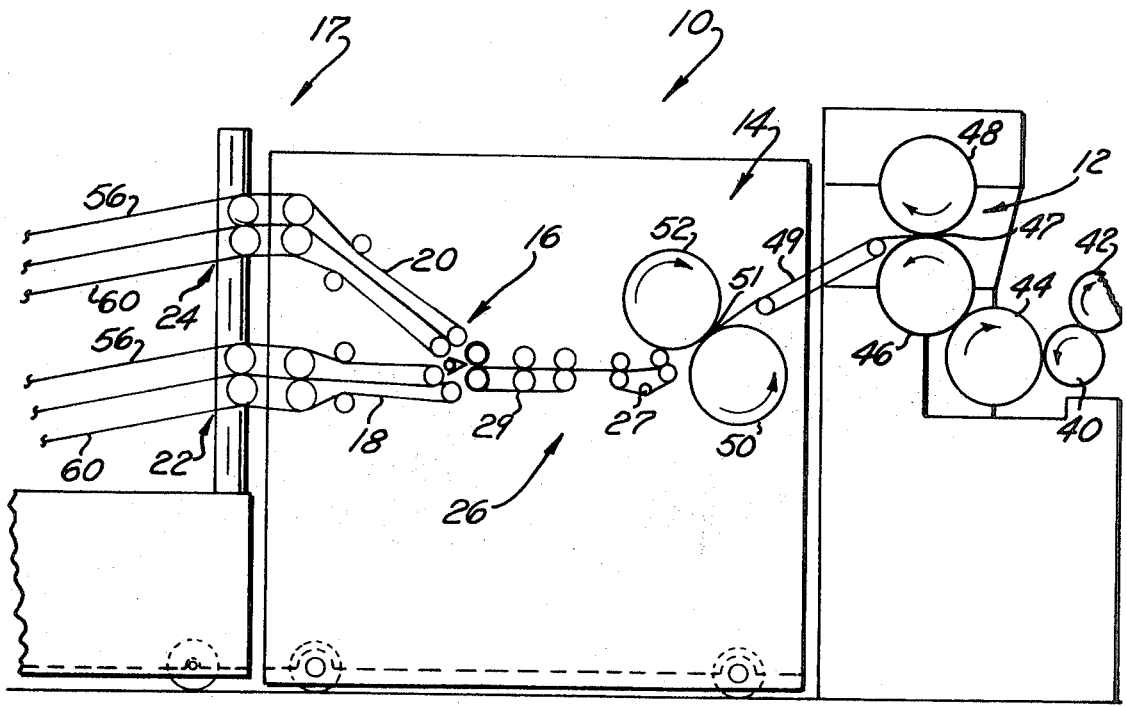
FIG. 1 is a schematic side elevational view of apparatus for processing a stream of articles embodying the present invention.

As representing a preferred embodiment of the present invention, FIG. 1 schematically illustrates an improved apparatus 10 for processing a stream of articles made of sheet material. The apparatus 10 includes, in general, a cutting and creasing unit 12 in which sheet material is cut and creased into carton blanks and waste material. The material cut into carton blanks and waste material is delivered from the cutting and creasing unit 12 into stripping means 14. The stripping means 14 is operable to separate the carton blanks and the waste and preferably delivers the carton blanks to a separator means 26 which separates the rows of articles by speeding up one row of articles relative to the next successive row of articles. After the rows of articles are separated, the separator means 26 delivers the carton blanks to an article classifying means 16 which classifies the articles and directs the articles to first means for receiving the articles 20 or the second means for receiving the articles 18. The articles, after they are classified by the article classifying means 16, are direct to the skewing conveyor unit 17 which laterally separates the carton blanks which are cut from the material and delivers the carton blanks to a shingling and stacking unit which is not illustrated. The shingling and stacking unit is operable to shingle the carton blanks and stack the carton blanks for removal from the apparatus in a well-known manner.

Preferably, the sheet material which is processed by the apparatus 10 is cardboard sheet material having an outline of a plurality of carton blanks printed thereon in closely spaced relationship and lying in rows on the material with each row extending transverse to the feed of the material. The sheet material is thus cut providing a plurality of carton blanks spaced immediately adjacent to each other in a row and the sheets are fed through the apparatus in this manner. The sheet material is so dimensioned that a plurality of rows of carton blanks are cut from each sheet.

Figure 2:
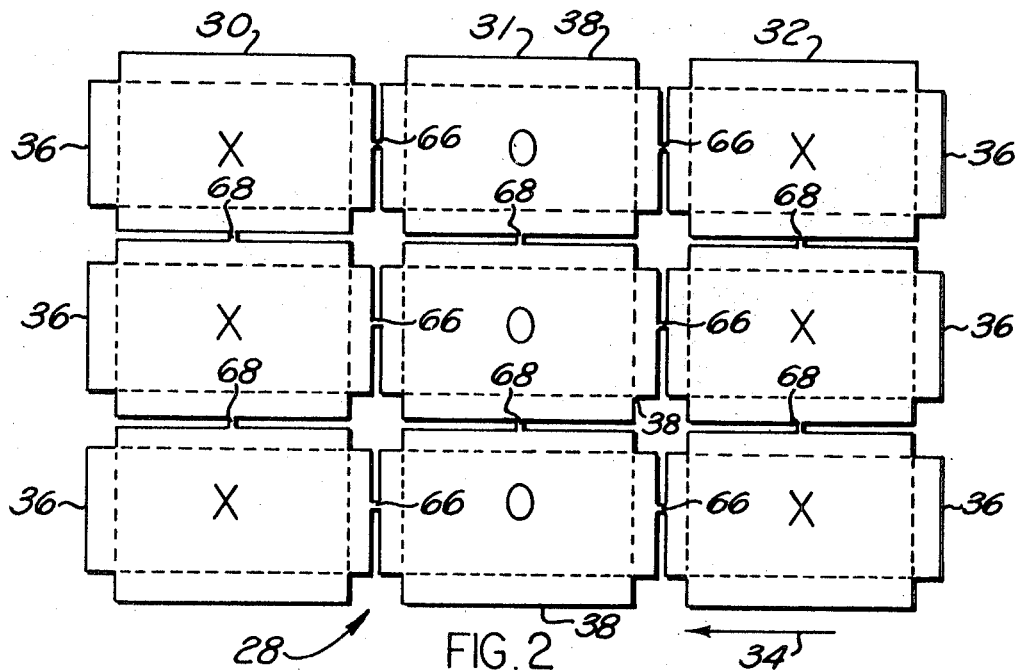
FIG. 2 is a schematic view of a sheet and the articles formed thereon as the sheet passes from the stripper.

A sheet 28 which has been partially processed by the apparatus 10 is shown in FIG. 2. The arrow 34 indicates the direction of feed of the material. The sheet 28 comprises three rows 30, 31 and 32. The rows 30, 31 and 32 each contain a desired number of carton blanks such as the blanks 36 having "X" printed thereon and the blanks 38 having "O" printed thereon. The blanks 36 which are disposed in the rows 30 and 32 of the sheet 28 are all blanks of the same type and the blanks 38 which are disposed in the row 31 of the sheet 28 are all blanks of the same type. While the blanks 36 and 38 may be different types of cartons or have different images printed thereon such as the "X" and "O" images illustrated in FIG. 2, it should also be realized that all of the blanks may be the same.

Figure 3:
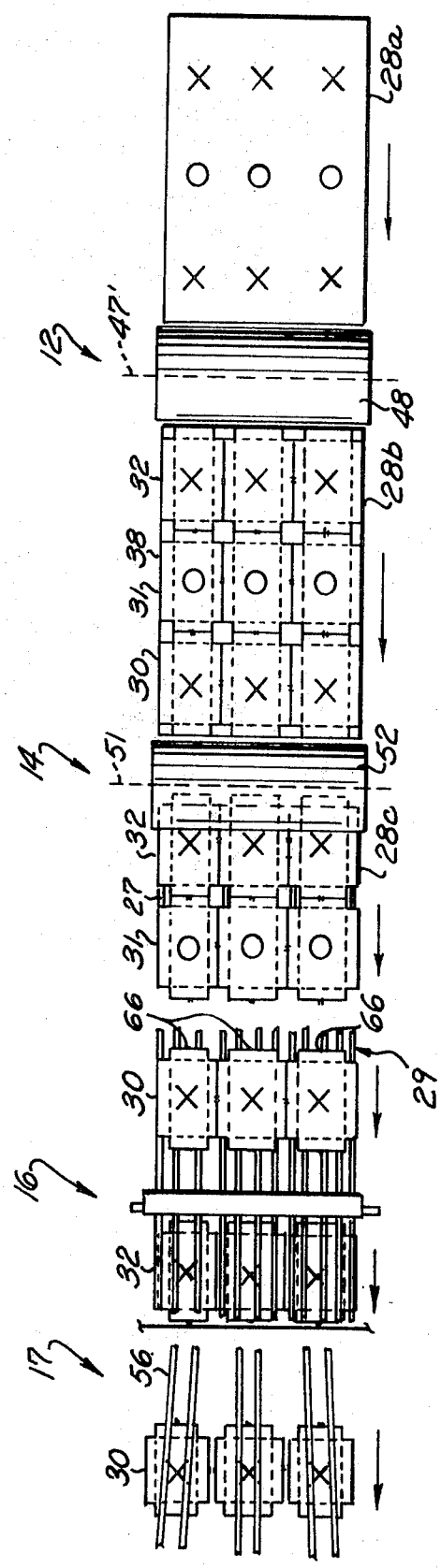
FIG. 3 is a schematic top view of the sheet and the articles formed thereon as the sheet progresses through the apparatus of FIG. 1.

When a sheet 28 is fed into the cutting unit 12, it has a configuration similar to the sheet 28a illustrated in FIG. 3. The printed sheet 28a is fed between a pair of rollers 40 and 42 which cooperate to direct the sheet to a transfer roll 44. The transfer roll 44 includes suitable gripper means thereon which engage with the sheet and direct the sheet from the rolls 40 and 42 to the cutting and creasing unit 12. The cutting and creasing unit 12 preferably comprises a pair of cutting and creasing rolls 46 and 48 which rotate adjacent each other at substantially the same surface speed. The cutting roll 46 includes suitable grippers thereon which engage with the sheet as it passes from the transfer 44 to thereby direct the sheet through a cutting nip 47 which is located between the pair of cutting and creasing rolls 46 and 48. As the sheet passes through the cutting nip 47, the cutting and creasing rolls 46 and 48 cooperate to cut and crease the sheet 28 as they pass therebetween in a well-known manner. A sheet 28b which has been cut and creased by the cutting and creasing unit 12 is illustrated in FIG. 3 as it passes from the cutting and creasing nip 47, whose position is shown schematically by the phantom line 47'.

After the sheets are cut and creased by the cutting and creasing unit 12, the sheets are then transferred by a conveyor 49 to a stripper means or unit 14 which is operable to separate the waste material from the articles. The stripper unit 14 preferably includes a pair of rotary cylinders 50 and 52 which cooperate to effect a separation of the carton blanks and waste delivered thereto. The cylinders 50 and 52 rotate adjacent each other and define a stripping nip 51 therebetween. The configuration of a sheet 28c, as it passes from the stripping nip 51, which is schematically shown by the phantom line 51', is illustrated in FIGS. 2 and 3. The rotary cylinders 50 and 52 which cooperate to separate the articles and the waste material are the same size as the cutting and creasing cylinders 46 and 48 and are driven at substantially the same surface speed. The cylinders 50 and 52 operate to separate the waste material from the carton blanks in a well-known manner and are more fully described in the Sarka U.S. Pat. No. 3,410,183, issued Nov. 12, 1968, and assigned to the same assignee as the present invention.

As the articles pass from the stripper unit 14, the transversely extending rows of articles are connected by tabs or nicks 66 which may be broken to separate the rows of articles and the laterally adjacent articles in each row are connected by tabs or nicks 68. A separator means 26 is operable to separate the transversely extending rows of articles and transfer the sheets 28c from the stripper unit 14 to the article classifying means 16. The separator means 26 may preferably include a conveyor unit 29 which is driven at a speed which is substantially greater than the speed at which the stripping unit 14 is driven.

A conveyor means 27 is preferably provided which moves at the surface speed of the stripping unit 14. The conveyor means 27 then engages with the top and bottom portion of a sheet while another portion of the sheet is still in the stripping nip 51 so as to move the sheet from the stripping unit 14 to the separator means 26. The conveyor unit 29 is driven at a substantially greater speed than the stripping unit 14 so that when the conveyor 29 engages with a sheet it will speed up the portion of the sheet engaged therewith relative to the portion of the sheet which is engaged with the conveyor means 27 or the stripper unit 14. This causes the tabs or nicks 66 between the rows 30 and 31 of articles to be broken and the rows of articles are separated from each other as shown in FIG. 3 at 28c. The separated transversely extending rows of articles 30, 31 and 32 then travel along the conveyor unit 29 to the article classifying means 16. It should be apparent that while the separator means 26 is illustrated receiving sheets from the conveyor 27, the conveyor 27 could be eliminated and the separator means could receive the sheets directly from the stripper unit 14. Moreover, while the exact construction of the separator means may vary a preferred construction thereof is illustrated in the copending Kacmarcik and Norton application Ser. No. 19,221 entitled FEEDER UNIT, assigned to the assignee of the present invention.

The article classifying means 16 is operable to direct the rows 30, 31 and 32 of articles to either the first means for receiving the articles which comprises the transfer conveyor unit 20 or the second means for receiving the articles which comprise the transfer conveyor 18. The article classifying means may preferably include a substantially triangular shaped gate which may move between two positions so as to direct the rows of articles into either of two paths defined by the conveyor units 18 and 20. A preferred construction of the article classifying means is illustrated in the Norton application Ser. No. 1,257, filed Jan. 7, 1970, and assigned to the assignee of the present invention. It should be apparent from FIG. 3 that the article classifying means 16 in this instance directs the rows 30 and 32 of articles 36 to the transfer conveyor unit 20 and the rows 31 of the articles 38 to the transfer conveyor unit 18. In this manner the articles are classified into their respective classes. The conveyor units 18 and 20 may operate at either the same or a slower speed than the conveyor unit 29.

As noted hereinabove, the carton blanks which are cut from the sheet material are located immediately adjacent to each other in a side-by-side relation. As shown in FIGS. 2 and 3, the rows 30, 31 and 32 are arranged so that there is no lateral separation of the carton blanks due to the operation of the stripper unit 14 of the separator means 26 and, therefore, the carton blanks are received by the skewing conveyor 17 in a close, laterally spaced relation. The skewing conveyor 17 includes an upper skewing unit 24 which operates on the articles as they move through a first path and a lower skewing unit 22 which operates on the articles as they move in a second path. Each of the skewing units 22 and 24 are operable to separate the carton blanks laterally so that the carton blanks may be readily and easily shingled and stacked without interference between adjacent carton blanks.

The skewing conveyor unit 17 includes an upper tier of skewing conveyors 24 for receiving carton blanks from the upper conveyor unit 20 and a lower tier of skewing conveyors 22 for receiving carton blanks from the conveyor unit 18. The upper and lower tiers of conveyors 22 and 24 each include a plurality of upper tape conveyors 56 and a plurality of lower tape conveyors 60. The upper side of the carton blanks are engaged by the plurality of upper type conveyors 56 and the lower side of the carton blanks are engaged by the plurality of lower tape conveyors 60. The tape conveyors 56 and 60 have a fan-like configuration which is well-known in the art and which is schematically illustrated in FIG. 3 so that as the articles pass therealong, the articles are engaged with the tapes which cooperate to break the tabs or nicks 68 which hold the articles in their respective rows. As the tabs are broken, the articles are laterally separated as is illustrated in FIG. 3. This lateral separation of the articles and the construction of the skewing conveyor 17 is more fully described in the Sarka U.S. Pat. No. 3,410,183.

Preferably, a shingling and stacking unit such as the shingling and stacking unit disclosed in the Sarka U.S. Pat. No. 3,410,183 is operable to receive the carton blanks from the skewing conveyor unit 17. The shingling and stacking unit shingles the carton blanks and stacks the carton blanks for removal from the apparatus. The operation of the shingling and stacking unit is well-known in the art and, therefore, has not been illustrated.

The sheet material from which the carton or box blanks are formed is generally a fibrous material which is composed of substantially parallel fibers. The articles are generally formed on the sheet with the transversely extending rows parallel to the fibers of the sheet material. The articles in each row are connected by first portions of the sheet material and the rows of articles are connected by second portions of the sheet material. The second portion of the sheet material comprises the tabs or nicks 66 which connect the transversely extending rows of articles and the first portion of the sheet material comprises the nicks 68 which connect the laterally adjacent articles in each of the rows. To enable the articles to be cleanly separated it is desirable to apply forces to the sheet material so as to separately break the nicks 66 along a line substantially parallel to the fibers of the sheet material and the nicks 68 along a line substantially perpendicular to the fibers.

If the nicks 66 are broken simultaneously with the nicks 68, clean separation of the articles does not necessarily occur. This is due to the fact that the forces which are applied to the sheet will have vector components thereof which are neither perpendicular to nor parallel to the fibers of the sheet. As a result, the vector components tend to pull the fibers apart and rip, rather than break, the nicks which interconnect the articles so that uneven or ragged portions of the nicks are left on the articles.

It can be seen from the hereinabove described embodiment that the separator means 26 initially applies forces perpendicular to the fibers of the sheet material to break the nicks 66. The separator means 26 does not break the nicks 68. The nicks 68 are broken by the skewing conveyor unit 17 which applies forces which are parallel to the direction of the fibers of the sheet material. This results in breaking the nicks 68 cleanly and, of course, since the nicks 66 have already been broken by the separator means 29 no forces will be applied thereto by the skewing conveyor 17. Thus, it should be apparent that the nicks 66 and the nicks 68 will be broken separately and sequentially so that clean separation of the articles will necessarily occur and rough or ragged nicks will not be left on the articles.

Moreover, the nicks 68 which connect the articles in the transversely extending rows will be broken after the articles are classified by the classifier means 16. This provides good control of the transversely extending rows of articles due to the fact that the articles in each of the rows will not be separated prior to classification thereof by the article classifying means 16. This is a vast improvement over the prior art in that if the articles are separated prior to classification the forces which act on the articles during separation may cause skewing of the articles which will result in the articles being susceptible to stumbling during classification thereof. In the present embodiment the articles are not separated until after classification thereof and the problem of stumbling and skewing of the articles during classification is eliminated. Moreover, because the nicks which hold the articles in their respective rows are not broken until after the articles are classified, better control of the articles may be obtained.

From the foregoing it should be apparent that a new and improved method and apparatus for separating and classifying articles made of sheet material has been described herein. The method and apparatus provide for moving the articles at a first surface speed while stripping the articles and then speeding up the articles to a speed which is in excess of the first surface speed so as to separate the transversely extending rows of articles. The separated transversely extending rows of articles are then classified and directed into one of two paths wherein the skewing conveyor operates on the articles to laterally separate the articles as they are conveyed thereby. This construction provides for the interconnected transversely extending rows of articles to be sequentially stripped, separated, classified, and then the articles of each row are laterally separated with the results that stumbling of the articles during classification is prevented and accurate control and clean separation of the individual articles is accomplished.

I claim:

1. An apparatus for processing articles made of sheet material and which articles are arranged in rows extending transverse to the direction of movement of the articles with each row having a plurality of articles connected by first portions of the sheet material and wherein each row is connected by second portions of the sheet material to an adjacent row, said apparatus including first means for moving the connected articles at a first speed, second means for receiving the articles from said first means and increasing the speed of one row of articles relative to the next successive row of articles to break said second portions of the sheet material and to separate the transversely extending rows of articles in the direction of feed thereof, classifying means for receiving each row of articles and for directing each separated row of articles with the articles in each row connected by said first portions of the sheet material into one of a plurality of paths, and skewing conveyor means for breaking said first portions of said sheet material to laterally separate the connected articles in each of the transversely extending rows as the articles move in the plurality of paths after classification of the rows of articles.

2. An apparatus for processing articles as defined in claim 1 wherein the sheet material is composed of fibers which extend generally transverse to the direction of movement of the articles, said first and second portions of the sheet material comprise nicks formed from the sheet material, said second means breaks the nicks comprising said second portions of the sheet material by effecting relative movement of adjacent rows of articles in the direction of advance of the articles to thereby break the nicks along a line generally parallel to the fibers of the material, and said skewing conveyor means breaks the nicks comprising said first portions of the sheet material by effecting relative movement of the adjacent articles transverse to the direction of advance of the articles to thereby break the nicks along a line generally perpendicular to the fibers of the material.

3. An apparatus for processing articles as defined in claim 1 wherein said classifying means comprises vertically spaced conveyors which define the plurality of paths, and an article deflecting gate located between said second means and said vertically spaced conveyors and having a portion engageable with the lead edge of a separated row of articles for directing the separated rows of articles into position to be conveyed by one of said plurality of conveyors.

4. An apparatus for processing articles as defined in claim 3 wherein said skewing conveyor means comprises a plurality of conveyor tapes for receiving articles from said vertically spaced conveyor means.

5. An apparatus for processing articles as defined in claim 1 wherein said first means for moving the articles at said first speed includes a first conveyor means for engaging with and moving the articles at said first speed and said second means for separating the transversely extending rows of articles includes a second conveyor means for moving the articles at a second speed which is in excess of said first speed, said second conveyor means engages with one row of articles as the next successive row of articles is engaged with said first conveyor means to thereby speed up to said second speed said one row of articles relative to said next successive row of articles which is moving at said first speed so as to separate said one row of articles from said next row of articles.

6. A method for processing articles made of sheet material and which articles are arranged in rows extending transverse to the direction of movement of the articles with each row having a plurality of articles connected by first portions of the sheet material and wherein each row is connected by second portions of the sheet material to an adjacent row including the steps of moving the connected articles at a first surface speed, speeding up one row of articles relative to the next successive row of articles to a second surface speed so as to break said second portions of the sheet material and separate the connected transversely extending rows of articles in the direction of movement thereof, directing the separated rows of articles, each of which rows has the articles therein connected by said first portions of the sheet material, into a plurality of paths, and breaking said first portions of the sheet material to separate connected articles in each of the rows of articles as the articles move through said plurality of paths.

7. A method of processing articles made of sheet material as defined in claim 6 wherein the sheet material is composed of fibers which extend generally transverse to the direction of movement of the articles and said first and second portions of the sheet material comprise nicks formed from the sheet material and wherein the step of speeding up one row of articles includes the step of breaking the nicks comprising said second portions of the sheet material along a line substantially parallel to the fibers of the sheet material by effecting relative movement of adjacent rows of articles in the direction of advance of the articles and the step of separating the laterally adjacent articles in each row includes the step of breaking the nicks comprising said first portions of the sheet material along a line substantially perpendicular to the fibers of the sheet material by effecting relative movement of the adjacent articles transverse to the direction of advance of the articles.

8. A method of processing articles made of sheet material as defined in claim 7 wherein the step of directing the separated rows of articles into a plurality of paths includes the step of classifying the rows of articles so that like articles are directed in like paths.

* * * * *